United States Patent [19]

Kofke, Jr. et al.

[11] Patent Number: 4,469,805
[45] Date of Patent: Sep. 4, 1984

[54] REGENERATION OF FILTER CLAY WITH LIQUID METHANOL

[75] Inventors: William A. Kofke, Jr., Irwin; Ilia Milson, Pittsburgh, both of Pa.

[73] Assignee: Gulf Research & Development Company, Pittsburgh, Pa.

[21] Appl. No.: 436,602

[22] Filed: Oct. 25, 1982

[51] Int. Cl.$^3$ ............... B01J 20/34; C10G 25/12; C10G 25/00
[52] U.S. Cl. ..................... 502/33; 208/254 R; 208/305; 208/307
[58] Field of Search ............. 252/414; 208/305, 307, 208/299, 189; 502/33

[56] References Cited

U.S. PATENT DOCUMENTS

| | | | |
|---|---|---|---|
| 1,403,198 | 1/1922 | Robinson | 252/414 |
| 2,673,176 | 3/1954 | Whitney | 252/414 |
| 3,208,157 | 9/1965 | Stark | 252/414 |
| 3,472,786 | 10/1969 | Urban | 252/414 |
| 3,965,036 | 6/1976 | Himmelstein | 252/414 |

Primary Examiner—P. E. Konopka
Attorney, Agent, or Firm—Deane E. Keith; Forrest D. Stine; Donald L. Rose

[57] ABSTRACT

Spent filter clay used in the removal of contaminating organic polar-type compounds from petroleum distillates is regenerated by flushing the spent filter clay with liquid methanol and recovering and recycling the contaminated wash methanol without distillation through the filter for additional flushing of the contaminants from the clay.

8 Claims, No Drawings

REGENERATION OF FILTER CLAY WITH LIQUID METHANOL

SUMMARY OF THE INVENTION

Spent filter clay, which is used in the removal of contaminating, organic polar-type compounds from petroleum distillates, is regenerated by percolating liquid methanol through the filter clay to wash out the residual petroleum distillate and to desorb these polar-type impurities. The used wash methanol is continuously recycled through the clay without being purified by distillation, yet it continues to remove the residual petroleum distillate and the polar-type compounds from the filter clay substantially as effectively as fresh methanol.

DESCRIPTION OF THE INVENTION

Filter clay is used to remove polar-type contaminants from a wide variety of petroleum products. The bulk of the contaminating compounds which are removed by the clay adsorbent contain one or more oxygen, nitrogen or sulfur atoms, including mixtures of these three elements. These contaminants, which generally are present in the hydrocarbon as a complex mixture involving many compounds from a variety of classes, impart one or more undesired characteristics, such as off-color, unpleasant odor, acid-forming tendency, and the like, to the hydrocarbon, which necessitates their removal in order to improve marketability of the product and to enable it to meet particular product specifications.

In a filtering cycle, the clay is used until it can no longer adsorb the undesired polar compounds. When the filter clay is so highly saturated with contaminant that treated hydrocarbon can no longer meet product specifications, the contaminated clay must either be regenerated or be discarded. Since the clay is so costly in the large quantities required in many refinery processes, repeated regeneration of the clay is an economic necessity, until satisfactory regeneration is no longer possible. Clay-burning in which spent clay is physically transferred to a burning unit and is heated to an elevated temperature to drive off the contaminants is a conventional, reasonably effective, but also labor and energy intensive, method for regenerating spent filter clay. Furthermore, since the clay progressively deteriorates, it is only susceptible to a limited number of successful regeneration cycles, generally within the range of about five to about ten burning cycles. The clay must then be discarded because of an inability to satisfactorily remove polar impurities following regeneration by burning.

The polar compounds which contaminate the petroleum hydrocarbons tend to concentrate during fractionation in the refinery in the higher boiling petroleum fractions. As a result, the filter clays used to purify heavier hydrocarbons can become the source of special problems in a refinery since these clays are much more quickly saturated with polar contaminants than is the clay used to purify the lighter fractions. Furthermore, this problem is amplified because the spent filter clays used with the heavier hydrocarbons are more intractable to regeneration due to the nature of the specific contaminating compounds present in the heavier hydrocarbons.

A need exists for an economical procedure which can successfully regenerate a filter clay many more times than is currently possible by burning the clay and one which is particularly suitable for regenerating clays used in the purification of the heavier hydrocarbons, that is, hydrocarbons heavier than kerosene. A new clay regeneration process should not only be able to decrease the clay replacement costs by significantly increasing the number of regeneration cycles that the clay can successfully undergo, but it also must be able to reduce the substantial labor and clay handling costs incurred by clay burning. Additionally, a new clay regeneration procedure must also be economical with respect to overall energy requirements.

In U.S. Pat. No. 3,472,786 a process is described for regenerating spent filter clay used in the purification of petroleum refinery process streams. One procedure described in the patent is the percolation of fresh liquid methanol, which is purified by distillation and recycled, through the clay bed until the exiting methanol does not contain a significant amount of contaminant. Although this procedure is effective in removing contaminant and in regenerating the clay, it entails substantial energy requirements for the distillation of the large volume of recycle methanol required by the process. In general, between about three and about twenty volumes of methanol per volume of clay are needed for clay regeneration by percolation with liquid methanol. The actual amount of recycle methanol that is required will, in part, depend on the nature of the adsorbent, the nature of the contaminants, the operating conditions, the desired degree of regeneration, and the like. Due to high energy costs, the fresh, liquid methanol-rinse process as described in the above patent has only limited commercial suitability.

Surprisingly, we have discovered that distilled, also called fresh, liquid methanol is not required for washing the adsorbed polar contaminants from spent filter clay. Instead, we have found that contaminated wash methanol can be reused as the wash fluid for the regeneration of spent filter clay in substitution for distilled methanol with substantially equivalent efficacy in removing the adsorbed polar impurities as is obtained with the distilled methanol. Furthermore, we have found that this impure, contaminated rinse methanol can be repeatedly recycled and reused without any noticeable decrease in its effectiveness in removing the polar impurities and regenerating the clay. As a result, the very high energy costs inherent in the distillation of large volumes of methanol as necessitated by the patented process have been largely obviated by our process. Additionally, our process possesses other advantages inherent in methanol washing when compared with clay burning, including no clay transfer or handling requirements, reduced labor requirements, lower overall energy requirements, less frequent replacement of clay, reduced filter plant contamination, and the like. Because of the substantial reductions in capital and operating costs effected by our process, the regeneration of spent filter clay by a liquid methanol rinse has become an economically feasible replacement for the present clay burning process.

This process is useful in the regeneration of a wide variety of contaminated adsorbent materials, including the naturally occurring clays such as fuller's earth, kaolin, kieselguhr, bentonite, and the like. It is also useful for the regeneration of contaminated silicas, the aluminas, the silica-aluminas, aluminosilicates such as the natural and synthetic zeolites, and the like. These materials are herein collectively called clays or solid adsorbents. This solid adsorbent is generally used as a fixed bed in a filtration column with the liquid undergoing treatment flowing or percolating downwardly through the bed. However, a slurry system can also be used for contacting the liquid and the particulate solid. The particle size of the adsorbent will, in general, vary from about 2 to about 100 mesh, but it is preferred that the particle size lie within the range of about 15 to about 40 mesh. It is also preferred that the particle sizes in any batch of adsorbent be generally uniform.

The contaminated liquid which is treated with the solid adsorbent for the removal of impurities is generally a hydrocarbon liquid, and the impurities are generally polar compounds. The solid adsorbent is most efficiently used in the removal of a minor and even minute concentration of contaminant from the hydrocarbon liquid to avoid rapid contamination and frequent regeneration of the clay. At the present time the use of filter clays with petroleum hydrocarbons predominates; however, other hydrocarbon liquids, including tar sand liquids, shale oil, synthesized coal liquids, and the like can be effectively filtered with the solid adsorbent. Since the polar contaminants tend to concentrate in the hydrocarbon fractions heavier than kerosene, clay filtration is most beneficially used with these heavier hydrocarbons.

It is believed that the filter clay functions, as the liquid hydrocarbon percolates through the bed, by attracting the polar compounds in the hydrocarbon to the surface and pores of the adsorbent particles. At a certain point in the filtration procedure, the clay becomes saturated with adsorbed impurities and substantially loses its ability to effect further contaminant removal. The particular saturation point depends on the nature of the adsorbent itself, the nature of the impurities, the characteristics of the hydrocarbon liquid, and the like. When the saturation point of the clay is approached or reached, the filtration is stopped and the regeneration of the clay is begun. The total volume of filtered hydrocarbon product obtained before regeneration is required per volume of clay, is generally regarded as the yield for any particular filtration cycle.

The function of the clay regeneration procedure is the removal of the polar contaminants as well as the removal of contaminated residual hydrocarbon liquid which is intimately associated with the filter clay and the polar contaminants on the clay. An inert gas purge of the filter bed preceding regeneration will only remove the hydrocarbon liquid from the interstices or free space in the bed, leaving the polar contaminants and a substantial portion of the hydrocarbon liquid which is wetting the clay particles and is in the pores of the clay. When the liquid wash methanol is flowed through the filter bed, it gradually removes both the polar contaminants and the remnant hydrocarbon liquid.

The wash liquid initially flowing out of the bottom of the filter column is noticeably darkened from the impurities. When this wash liquid is permitted to stand for a moderate period of time, the wash liquid will separate out into two phases, a bottom, dark-colored hydrocarbon phase and a top, light-colored methanol phase due to the relative immiscibility of these two organic liquids at the washing temperature. Fortuitously, a substantial proportion of the removed polar contaminant is retained in the hydrocarbon phase and is simply removed from the system by decanting off the upper, partially contaminated methanol layer for recycling. However, the recovered methanol does contain some contaminant, as is evidenced by a noticeable discoloration. When this batch of recovered, contaminated methanol is recycled as a wash fluid, an additional quantity of polar contaminant and residual hydrocarbon are removed from the filter clay. This methanol, after its recovery by non-distillative separation, is generally referred to in this specification by the expression "contaminated recycle methanol", and the like. The decanting and recycling of the contaminated methanol is continued until the contaminants on the clay are substantially removed. A visual inspection of the wash methanol recovered at the bottom of the filter tower often evidences the completion of the decontamination procedure.

This filter clay is now essentially free of the polar contaminant and can be reused as a filtering medium once the residual wash methanol is removed. A simple procedure for the removal of the residual methanol is to percolate the product hydrocarbon fluid undergoing purification through the filter clay and permitting this stream to rinse out the methanol. However, since this procedure will contaminate a substantial quantity of the product hydrocarbon with methanol, which contaminated product must be separated and be specially treated for methanol removal or be discarded, we find that this procedure is not economically effective. This residual wash methanol can also be drawn out by applying a vacuum to the clay tower with concurrent heating of the clay to vaporize the methanol still retained in the pores of the clay. Preferably this vaporization procedure is preceded by rinsing the clay with pure methanol to make certain that the polar impurities in the residual methanol in the clay are not redeposited on the clay as the methanol vaporizes. The methanol retained in the pores can, also, be removed by injecting a hot inert gas such as methane or nitrogen through the clay bed to vaporize the methanol. However, this procedure is handicapped by the need for large volumes of the inert gas to compensate for its low specific heat.

Another procedure, and the one which we prefer, is to vaporize and drive off the residual wash methanol retained by the clay by injecting superheated methanol vapors into the clay bed. These methanol vapors will initially condense in the cooler clay bed as they heat it up, forming a moving front of pure liquid methanol which propels the retained methanol ahead of it through and out of the bed. This methanol vapor flush can be assisted and the time shortened by steam heating the clay bed by means of suitably positioned heating coils. When the liquid methanol, including both the residual wash methanol and the condensed liquid methanol, has been completely vaporized and eliminated from the clay bed, the vaporization procedure can be terminated.

In this overall procedure utilizing first a liquid methanol rinse, and second a methanol vapor flush, all of the liquid methanol rinsed through the bed can be a contaminated recycle methanol if contaminated methanol from a prior regeneration is available to start the clay regeneration procedure. However, if such contaminated methanol is not available, fresh liquid methanol must be initially flushed through the clay bed to initiate the regeneration until sufficient methanol is available for recycling. Additionally, some fresh liquid methanol can be flushed through the bed, if desired, to rinse out the recycle methanol at the end of the liquid methanol rinse and prior to the injection of the superheated methanol vapors. But, it is noted, that since the present process involves the use of non-distilled recycle methanol to reduce the distillation costs, the greater the amount of non-distilled recycle methanol that is used, the greater will be the savings. Therefore, in order to obtain substantial savings, a substantial proportion of non-distilled methanol must be recycled through the clay bed in replacement of fresh methanol. Desirably at least about 25 percent of the liquid wash methanol should be non-distilled recycle methanol in order to effect significant savings. However, preferably at least about 50 percent non-distilled recycle methanol, and more preferably at least about 75 percent or more, non-distilled recycle methanol is used in replacement of fresh liquid wash methanol for substantial savings.

The methanol vapors injected into in the clay bed to flush out the residual wash methanol are next removed in order to avoid methanol contamination of the hydrocarbon product in the succeeding percolation procedure. This is readily accomplished by flowing a hot gas, preferably inert, such as nitrogen, carbon dioxide, flue gas, methane, and the like, through the clay bed. The methanol can be condensed from the rinse gas and recovered or it can be discarded. If heated methane, i.e. natural gas, is used, the rinse gas containing the methanol vapors can be burned in the plant as a fuel. But if natural gas is used to flush out the methanol vapors, the natural gas will likely contaminate the first portion of the percolating hydrocarbon stream in the subsequent purification procedure and lower its flash point below product specifications. To avoid this possibility, the natural gas is removed by purging the clay bed with another inert gas such as nitrogen at ambient temperature. We have found this two-step inert gas purge procedure to be economically desirable since it requires a much larger volume of inert gas to rinse out the methanol vapors than is required to flush out this natural gas and since natural gas is generally much cheaper than pure nitrogen and can be reused as a fuel. The natural gas can also be removed by applying a vacuum to the clay bed.

The filtration process can be used for a variety of contaminated feed materials ranging in viscosity from naphthas to waxes. The temperature of the filtration, in part, for this reason can vary from ambient up to about 250° F. or higher, but filtration within about 75° to about 150° F. is most common. The regeneration of the adsorbent material using liquid methanol can be carried out at a temperature ranging from ambient up to about 150° F. or higher under appropriate pressure, but a temperature ranging from about 50° to about 125° F. is preferred.

DESCRIPTION OF PREFERRED EMBODIMENT

In each of the following examples, a series of filtration-regeneration cycles were carried out. The oil undergoing purification was a hydrogen-treated, light oil distillate having a 100° F. viscosity of 60 SUS and obtained from a naphthenic-type Texas Gulf coast crude. In all examples a commercial 16/30 mesh attapulgite filter clay was used to produce a transformergrade oil having a maximum nitrogen content of 20 ppm. The transformer oil product was tested for oxidation stability of ASTM D 2440.

EXAMPLE 1

In this experiment the use of fresh, uncontaminated methanol throughout was studied. A 129 g portion of the filter clay was placed in a 1.5-inch I.D. vertical glass column to a bed depth of about 6.7 inches. The light hydrocarbon distillate was fed to the top of the column at the rate of one barrel of oil per ton of clay per hour, while maintaining a liquid level above the clay of about 12 inches. After 75 barrels of purified oil per ton of clay was produced, the filtering operation was terminated. The clay was then regenerated by rinsing the bed with fresh methanol at about 75° F. and at atmospheric pressure to remove the impurities and the oil that was held back by the clay (about four barrels of oil per ton of clay). The methanol was then removed from the clay bed with a stream of hot air at atmospheric pressure until a mid-bed temperature of about 220° F. was reached.

A second batch of the oil was filtered as before and the regeneration of the bed was carried out as before. This procedure was repeated in a series of filtration-regeneration cycles in which the fresh rinse methanol was used in an amount ranging from about 12 to 20 volumes of methanol per volume of clay per regeneration cycle. Selected analyses of the freshly filtered oil over a series of sixteen filtrations and fifteen regenerations is set out in Table I to demonstrate the effectiveness of clay bed regeneration using fresh methanol only.

TABLE I

| Regeneration No. | Fresh Oil | 0 | 3 | 7 | 11 | 15 |
|---|---|---|---|---|---|---|
| Total nitrogen, ppm Oxidation, ASTM D 2440 | 48 | 10 | 14 | 13 | 16 | 19 |
| 72 hour | | | | | | |
| sludge, wt % | 1.14 | 0.06 | 0.04 | 0.05 | 0.06 | 0.07 |
| total acid No. | 3.06 | 0.43 | 0.22 | 0.22 | 0.22 | 0.33 |
| 164 hour | | | | | | |
| sludge, wt % | 2.22 | 0.12 | 0.13 | 0.12 | 0.12 | 0.28 |
| total acid No. | 3.80 | 0.43 | 0.32 | 0.28 | 0.33 | 0.44 |

EXAMPLE 2

The oil filtration and regeneration process of Example 1 was repeated through nineteen regeneration stages except that contaminated, recycle wash methanol was used in the regeneration of the clay. In each regeneration an initial charge of fresh methanol was used which varied between 4.6 and 10 volumes of fresh methanol per volume of clay. The straw-colored, contaminated methanol effluent was decanted from an oil phase and recycled through the clay bed until a substantial quantity of contaminated wash methanol, which varied from 10 to 27 volumes per volume of clay per regeneration cycle, had been passed through the clay bed. The analysis of the oil freshly filtered following selected regeneration stages is set out in Table II.

TABLE II

| Regeneration No. | 0 | 3 | 7 | 11 | 15 | 19 |
|---|---|---|---|---|---|---|
| Total nitrogen, ppm Oxidation, ASTM D 2440 | 13 | 16 | 17 | 19 | 19 | 20 |
| 72 hour | | | | | | |
| sludge, wt % | 0.04 | 0.04 | 0.05 | 0.05 | 0.08 | 0.08 |
| total acid No. | 0.32 | 0.19 | 0.22 | 0.22 | 0.38 | 0.33 |
| 164 hour | | | | | | |
| sludge, wt % | 0.12 | 0.13 | 0.10 | 0.14 | 0.14 | 0.12 |
| total acid No. | 0.43 | 0.32 | 0.30 | 0.33 | 0.44 | 0.33 |

The data is Tables I and II show that the use of contaminated recycle methanol is equivalent to the use of fresh methanol in the regeneration of filter clay as evaluated by the quality of the oil subsequently purified using the regenerated clay.

EXAMPLE 3

These were larger scale experiments demonstrating the effectiveness of using contaminated recycle methanol for regenerating the spent clay. The clay filter contained 235 pounds of clay in a bed 18 inches in diameter and 4.5 feet high. The oil was force fed through the clay filter under a pressure head of about 0.5 psig. Prior to use in these experiments, the fresh clay had not been used in oil filtration but had been subjected to several methanol rinsing and methanol removal experiments. This clay was then used in the purification of the transformer oil through four cycles involving three intervening regenerations. The oil was percolated through the clay at a liquid hourly space velocity of between about 0.05 and 0.07 at a temperature of about 75° F. The results of each oil filtration together with the corresponding product limits for transformer oil are set out in Table III.

TABLE III

| Regeneration No. | 0 | 1 | 2 | 3 | Product Limits |
|---|---|---|---|---|---|
| Total nitrogen, ppm Oxidation, ASTM D 2440 72 hour | 17 | 16 | 14 | 13 | max. 20 |
| sludge, wt % | <0.01 | 0.09 | <0.01 | 0.05 | max. 0.15 |
| total acid No. | 0.11 | 0.11 | 0.03 | 0.11 | max. 0.5 |
| 164 hour | | | | | |
| sludge, wt % | 0.09 | 0.16 | 0.03 | 0.08 | max. 0.3 |
| total acid No. | 0.16 | 0.11 | 0.11 | 0.11 | max. 0.6 |
| Yield, barrels/ton | 32 | 45 | 41 | 45 | |

In each clay regeneration cycle, the clay was first rinsed with about four volumes of fresh methanol per volume of clay at ambient temperature (75° F.). The contaminated methanol was recovered, separated from an oil phase, and recycled without further purification. This recycling of contaminated methanol was continued until a total of about eleven and one-half volumes of contaminated methanol per volume of clay had been recycled. This was followed by a final rinse with about two volumes of fresh methanol per volume of clay. After the final methanol rinse, the liquid methanol was separated from the clay bed by injecting superheated methanol vapors at 310° F. through the clay bed. Following this, the methanol vapors were purged from the clay by flowing natural gas at 280° F. through the clay bed for 12 hours. And finally, the natural gas was purged from the clay bed by flowing nitrogen gas at 75° F. through the bed for one hour.

EXAMPLE 4

The following is a calculated demonstration of the invention as it is expected it would operate in a commercial sized scale. Two clay percolation filters are used for the final purification of transformer oil containing trace quantities of polar impurities and analyzing 50 ppm nitrogen. Each tower contains about 450 barrels (42 gal.) of 16/30 mesh attapulgite filter clay in a bed about thirty feet deep and ten feet in diameter. One unit is used in a filtration run while the other unit undergoes regeneration. Oil is pumped into a freshly regenerated filter tower until the clay is fully submerged in the oil. Percolation is then initiated at an oil feed rate of about 40 barrels per hour. After about 1,600 barrels of the oil have been filtered, the average nitrogen concentration in the product oil has reached 20 ppm nitrogen and the filtration is stopped and regeneration is initiated.

The oil remaining in the void space of the bed is physically displaced with nitrogen at a moderate pressure, leaving about 120 barrels of oil and polar contaminant in the pores of the clay. To initiate regeneration, the clay tower is filled with fresh methanol, which is percolated through the clay bed until about 900 barrels of alcohol have been fed through the clay. Strongly discolored wash methanol is fed from the bottom of the clay tower to a settling tank, permitting a dark-colored oil layer to settle out. The straw-colored alcohol solution is withdrawn and is recycled to the top of the clay tower. This washing, decanting and methanol recycle sequence is repeated until about 4,500 barrels of the contaminated methanol have been rinsed through the clay. The contaminated wash methanol in the bed is rinsed out with about 900 barrels of fresh methanol. About 1,500 barrels (liquid) of superheated methanol vapors at 300° F. are next injected into the bed to remove the liquid methanol. Following this, the methanol vapors are ejected with natural gas at 300° F., and the natural gas is ejected with nitrogen at 80° F. The clay is now ready for the next filtration cycle.

It is to be understood that the above disclosure is by way of specific example and that numerous modifications and variations are available to those of ordinary skill in the art without departing from the true spirit and scope of the invention.

What is claimed is:

1. A process for regeneration of a bed of a particulate, adsorbent material that is at least partly saturated with organic, nitrogen-containing, polar-type contaminant material which has been previously removed from a transformer oil charge stock by percolating said charge stock through the bed of adsorbent material, which process comprises:
    (a) discontinuing flow of the transformer oil charge stock through the adsorbent bed;
    (b) passing liquid methanol wash fluid through the bed of adsorbent material, whereby at least a portion of the nitrogen-containing polar-type contaminant and at least a portion of the residue of the transformer oil charge stock retained in the bed of adsorbent material are removed therefrom, and whereby the methanol wash fluid becomes partially contaminated with the nitrogen-containing polar-type contaminant;
    (c) collecting the mixture of partially contaminated methanol wash fluid and the transformer oil charge stock in a separating zone;
    (d) recovering contaminated methanol wash fluid from the mixture thereof with transformer oil charge stock in the separating zone by non-distillative separation;
    (e) recycling the contaminated methanol wash fluid through the adsorbent material, whereby additional nitrogen-containing polar-type liquid contaminant material is removed from the adsorbent material; and
    (f) continuing the collection, separation and recycling of the contaminated methanol only until the nitrogen-containing polar-type contaminant in the bed of adsorbent material has been substantially removed therefrom.

2. A process for the regeneration of a bed of contaminated adsorbent material in accordance with claim 1 in which the contaminated methanol wash fluid is recovered by gravity separation from the rinsed-out portion of the non-miscible, residual hydrocarbon charge material.

3. A process for the regeneration of a bed of contaminated adsorbent material in accordance with claim 2 in which from about three to about twenty volumes of said contaminated liquid methanol wash fluid per volume of adsorbent material is recycled and passed through said bed of adsorbent material.

4. A process for the regeneration of a bed of contaminated adsorbent material in accordance with claim 2 in which the temperature of said adsorbent material is between about 50° F. and about 125° F.

5. A process for the regeneration of a bed of contaminated adsorbent material in accordance with claim 2 in which the residue of contaminated liquid methanol wash fluid in the adsorbent material is displaced by the injection of superheated vaporized methanol into the bed of adsorbent material.

6. A process for the regeneration of a bed of contaminated adsorbent material in accordance with claim 5 in which residual methanol vapor in the adsorbent material is displaced with a hot, inert gas.

7. A process for the regeneration of a bed of contaminated adsorbent material in accordance with claim 6 in which the inert gas comprises methane.

8. A process for the regeneration of a bed of contaminated adsorbent material in accordance with claim 7 in which the inert gas comprising methane is displaced with nitrogen.

* * * * *